United States Patent [19]
Buxton et al.

[11] Patent Number: 6,115,025
[45] Date of Patent: Sep. 5, 2000

[54] SYSTEM FOR MAINTAINING ORIENTATION OF A USER INTERFACE AS A DISPLAY CHANGES ORIENTATION

[75] Inventors: William Arthur Stewart Buxton; Jeffrey Allen Bell, both of Toronto, Canada

[73] Assignee: Silicon Graphics, Inc., Mountain View, Calif.

[21] Appl. No.: 08/941,102

[22] Filed: Sep. 30, 1997

[51] Int. Cl.[7] .................................................. G09G 5/00
[52] U.S. Cl. ......................... 345/126; 345/146; 345/166
[58] Field of Search ................................... 345/126, 355, 345/146, 166

[56] References Cited

U.S. PATENT DOCUMENTS

| | | | |
|---|---|---|---|
| 4,267,555 | 5/1981 | Boyd et al. | 340/748 |
| 4,542,377 | 9/1985 | Hagen et al. | 340/727 |
| 4,545,069 | 10/1985 | Kermisch | 382/46 |
| 5,329,289 | 7/1994 | Sakamoto et al. | 345/126 |
| 5,566,098 | 10/1996 | Lucente et al. | 364/708.1 |
| 5,774,233 | 6/1998 | Sakamoto | 358/451 |
| 5,818,420 | 10/1998 | Mitsumine et al. | 345/156 |

Primary Examiner—William A. Cuchlinski, Jr.
Assistant Examiner—Marthe Y. Marc-Coleman
Attorney, Agent, or Firm—Staas & Halsey LLP

[57] ABSTRACT

A system that includes a flat panel display that can change three-dimensional orientation in a continuous way, such as when the display is horizontally rotated on a turntable. Position or orientation of the display relative to a reference orientation is sensed by orientation sensors coupled to the display. A computer compares the orientation of the display to a fixed reference orientation. When the orientation of the display has changed from the reference, the computer maps the orientation of a user interface onto the display in such a way as to maintain the same orientation of the interface with respect to the reference. User input through an overlaid input device correlates to the oriented user interface. In this way if the display is rotated into, for example, a sideways or upside-down orientation, the user interface elements will still be displayed in a normal upright orientation for the user and the user inputs in a normal manner. When multiple users interact with the display, the orientation of each user with respect to the reference is tracked by the computer and the particular user's interface orientation is maintained constant with respect to the particular user's reference.

21 Claims, 4 Drawing Sheets

SYSTEM FOR MAINTAINING ORIENTATION OF A USER INTERFACE AS A DISPLAY CHANGES ORIENTATION

BACKGROUND OF THE INVENTION

1. Field of the Invention

The present invention is directed to a system allowing a user to change the orientation of a physical display while the on screen user interface maintains its original orientation and, more particularly, to a system sensing changes in the orientation of the physical display and keeping the user interface aligned with the user as the display orientation changes to thereby maintain position or direction sensitive components of the interface aligned with the user.

2. Description of the Related Art

When drawing, artists typically do not leave their art work in a static position. Human biomechanics make some drawing gestures easier than others. Hence, the artist will shift and/or rotate the art work on the desk top to facilitate drawing. For example, the artist might rotate the drawing into a sideways position so that a downward stroke can be used in a horizontal direction of an animation cell. Some mechanical aids to drawing reflect this need. An example is the Acme animation stand in which a pin-registered plastic animation cell can be rotated for the convenience of the artist. The properties of computer graphics systems to date have meant that this type of manipulation of the art work has not been practical, even though it is desirable.

What is needed is a system that will allow computer graphics systems to have the convenience of a piece of paper.

Display units currently exist, such as the Pivot Display System available from Portrait Displays, in which the orientation of the display can be changed from page to landscape, so that a long axis of a rectangular displayed image can be oriented in two positions, either horizontally or vertically. When the display unit is in the page orientation, the images are displayed in page mode and when the display unit is in the landscape orientation, the images are displayed in landscape mode. In this situation, there are no in between positions and the entire display, including all interface elements, flip from page to landscape. The entire image, including interface elements, is maintained in the same orientation with respect to the user. Such displays only benefit the artist in that they can display the artist's work in either a "landscape" or "portrait" aspect ratio, unlike conventional monitors that display only one or the other. The aspect ratio of the display can match that of the art. However, this type of system does not help the drawing process.

What is needed is a display in which continuous changes in orientation can be sensed and used to make appropriate changes to the displayed art work and user interface.

Display units also have been described, such as the Fakespace Boom, which can be changed in orientation and the view of an object or image provided by the display also changes. In using such a display the user maintains the display in the same relative orientation to himself and, as a result, such a display typically has not addressed how interface elements behave when the orientation is changed. That is, the art work is rotated but not the display or the user interface.

What is needed is a system that addresses the display of the interface elements as orientation changes.

When a typical computer display, such as the Sharp LC-104TW1 display, containing art work is changed in orientation, such as when it is rotated, the user interface also rotates. Essentially the world and the user interface rotate with the display. For example, when a display is rotated so that the display is upside-down, the user interface, such as a pop-up menu, is also upside-down. This requires the user to use the interface in an upside-down fashion. While this is somewhat of a problem for pop-up menus where the buttons will be upside-down, it is even more of a problem for orientation or direction sensitive interfaces, such as marking menus, where the direction of a stroke made by the user, on an interface which has a defined orientation with respect to the user, makes the item selection. In an upside-down marking menu the user's stroke would have to be in the opposite direction for the same selection as compared to when the menu is right-side-up. As flat panel displays become more popular, the treatment of such displays as if they were a piece of paper, where they are moved, tilted and rotated, in Acme-like desks where an LCD is used, will occur. Because the user interface elements in such cases also rotate, etc. all of the built-in motor memory associated with using paper is lost.

What is needed is a system that allows the user to change the orientation of the display, like the rotatable animation stand, senses the changes in orientation of the display and yet maintains the orientation of the user interface toward the user.

In cases where one draws directly on the screen, such as with a light-pen or stylus, the physical bulk of the monitor preempts easy rotation of the physical drawing surface. In indirect drawing, such as when using a tablet, one can rotate the tablet to some degree, but if the angle is too great, the compatibility of the mapping between the tablet surface and the display of the art work is lost. Attempting to rotate the art work on the display rather than the display itself can be done conceptually, but paint programs in the past have had the problem of aliasing that results when rotating a raster of pixels by anything other than increments of 90 degrees.

What is needed is a system that allows the art work to be rotated without encountering the aliasing problem.

Today the interface with art work can be a collaborative effort. For example, several different people sitting around a single image can make changes to the art work. For example, people gathered around a rotatable light table containing an image of a three-dimensional model or image can all make changes to the image. In such a situation, each person is looking at the image from a different position. Typically each graphic artist has a set of tools they prefer and these are used on the image. Today changing between interfaces responsive to the artist working on the art work is not provided.

What is needed is a system that detects different users and user orientations, and supplies the preferred interface for the users in the proper orientation for the users as a display containing the image changes orientation.

SUMMARY OF THE INVENTION

It is an object of the present invention to provide a display that can be treated like a piece of paper where it can be moved, flipped, rotated, etc. while the user interface elements maintain their orientation with respect to the user.

It is an object of the present invention to provide a system that senses continuous changes in the orientation of a display.

It is another object of the present invention to maintain the orientation of a user interface on the display as the display itself changes orientation.

It is also an object of the present invention to prevent direction or location sensitive user interfaces from being affected by changes in orientation of the display.

It is a further object of the present invention to detect the orientation of plural users.

It is an object of the present invention to provide each user with the user's preferred interface in the proper orientation.

It is another object of the present invention to allow art work or documents to change orientation while interface elements remain in a fixed orientation.

It is a still further object of the present invention to provide a display in which the menus are always oriented appropriate to the user independent of the orientation of the art work on the display and independent of the orientation of the display.

It is an object of the present invention to provide software that adapts a display image, including user interface elements and images being manipulated, to the context of the orientation of the display.

The above objects can be accomplished by a system including a display that can change orientation. Position or orientation of the display relative to a reference orientation is sensed. The orientation of the display is compared to the reference orientation. When the orientation of the display has changed from the reference, the orientation of the user interface of the display is changed to maintain the same orientation with respect to the reference. When multiple users interact with the display, the orientation of each user with respect to the reference is tracked and the particular user's interface orientation is maintained constant with respect to the reference.

These together with other objects and advantages, which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is directed to maintaining the orientation of user interface elements on a display, with respect to a user, despite any movement of the display, such as during rotation. This involves setting a reference "normal" orientation for the display, monitoring changes in orientation of the display relative to the normal and mapping the user interface elements to appear in their proper orientation with respect to the user and the normal.

Figure 1:
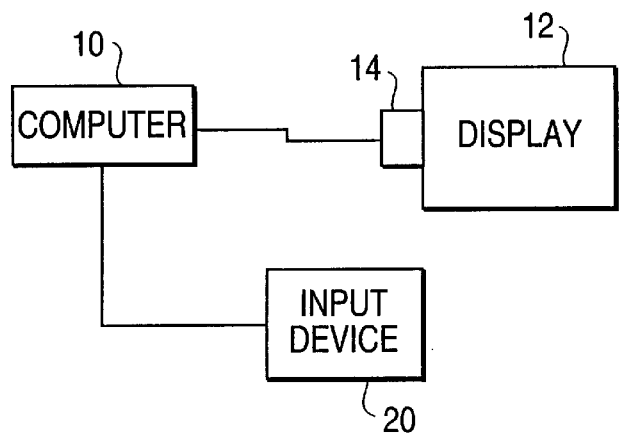
FIG. 1 depicts hardware components of the present invention.
Figure 2:
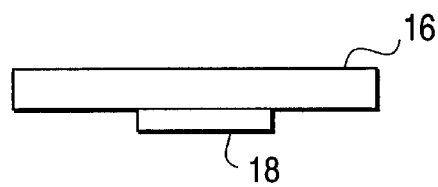
FIG. 2 depicts a flat panel display that rotates via a turntable.

The present invention, as depicted in FIG. 1, preferably is implemented using a work station computer 10, such as is available from Silicon Graphics, Inc., although the invention can be implemented using a personal, mainframe, super or specialized computer. The processes discussed herein are typically stored on a storage medium, such as a disk. The computer 10 senses the orientation/position of a display 12 using orientation sensors 14. The display 12 is preferably a conventional flat panel type display but could be a CRT type display as long as it is of some size/mass allowing a user to easily move, rotate, tilt, etc. it; that is, the display preferably has three degrees of freedom. For example, a liquid crystal, flat panel display 16 fixed to a turntable 18, as depicted in FIG. 2, is appropriate. The display 12 displays a work image, such as art work, documents, photographs, graphics, etc., on which a user is working. The orientation sensors 14 are conventional sensors, such as optical rotation position encoders, that can sense essentially continuous rotation as well as continuous tilt and horizontal motion. The input device 20 (see FIG. 1) can be any of a number of conventional input devices such as tablets, keyboards, etc. When used in an indirect configuration the device 20 is separate from the display 12. However, a touch or position sensitive overlay on display 12 or light pens or some other input device integrated with the display 12, creating a direct configuration, allowing the user to work directly with the display 12 are preferred as the input device 20.

Figure 3A:
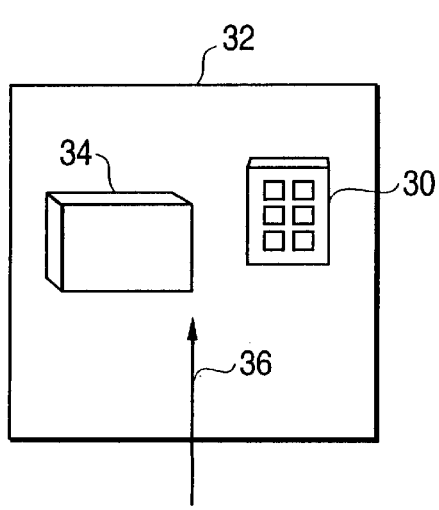
FIGS. 3a, 3b and 3c illustrate display rotation with the user interface elements being maintained in alignment with a viewing reference.
Figure 3B:
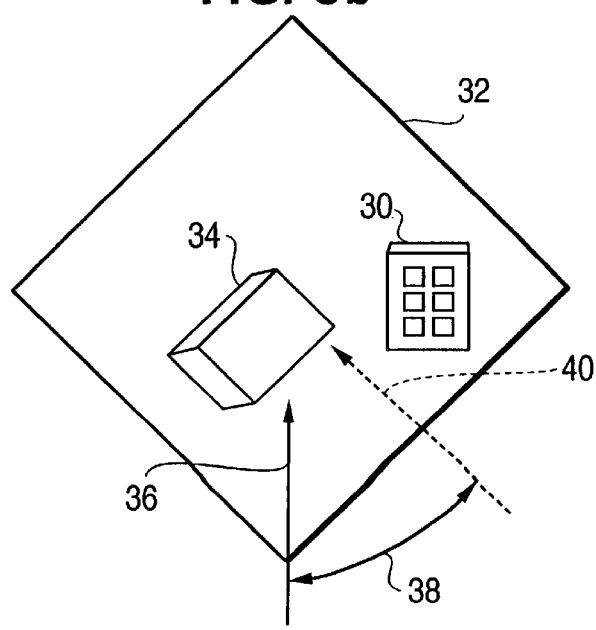

The change in orientation of the user interface with respect to the change in orientation of the display is depicted in FIGS. 3a and 3b. In FIG. 3a a button type menu 30 is shown on the right side of the display 32 with a model (a rectangular box) or a graphic image shown on the left side. A normal viewing orientation reference for the user is depicted by the arrow 36 where the direction of the arrow would be considered "up." This reference 36 is considered to be fixed with respect to the user or fixed independent of the orientation of the display 32. FIG. 3b depicts the display 32 rotated by 45 degrees, such as would occur when a flat panel display is rotated 45 degrees on a turntable. The model 34 turns with the display 32 while the interface element 30 remains aligned with the normal viewing reference 36. To do this, the interface element 30 is essentially rotated in the opposite direction as the display 32. In practice this is done by mapping the interface 30 onto the display 32, after the orientation of the display with respect to the reference 36 is known. The amount or angle of rotation 38 is determined by the current orientation 40 of the display 32 and the reference normal 36, and is determined by comparing the orientations of the references 36 and 40 and determining the difference.

FIGS. 3a and 3b illustrate a situation where the model 34 turns with the display 32. It is possible for the point of view of or view port onto the model to rotate with the display. This can be seen by comparing FIGS. 3a and 3c. In this situation the display has rotated 45 degrees while the model has remained stationary resulting in a shift of view point around the model by 45 degrees. Again the interface element 30 has remained aligned with the reference viewing normal 36.

Figure 4:
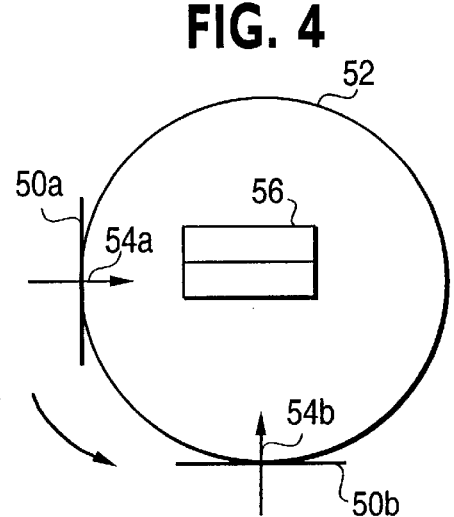
FIG. 4 depicts revolving of a display.

When a vertical display 50a, 50b is revolved in a circle 52, like around a drum, as depicted in FIG. 4 different views 54a and 54b of the object 56 can be obtained. That is, as the orientation of the display changes the view point of or view port onto the object changes. Although not shown the same change in view point can occur when the display is tilted. For example, when the display panel is horizontal, the view would be from above a house model and when the display is tilted somewhat vertically the view would be from one of the sides of the house model.

Figure 5:
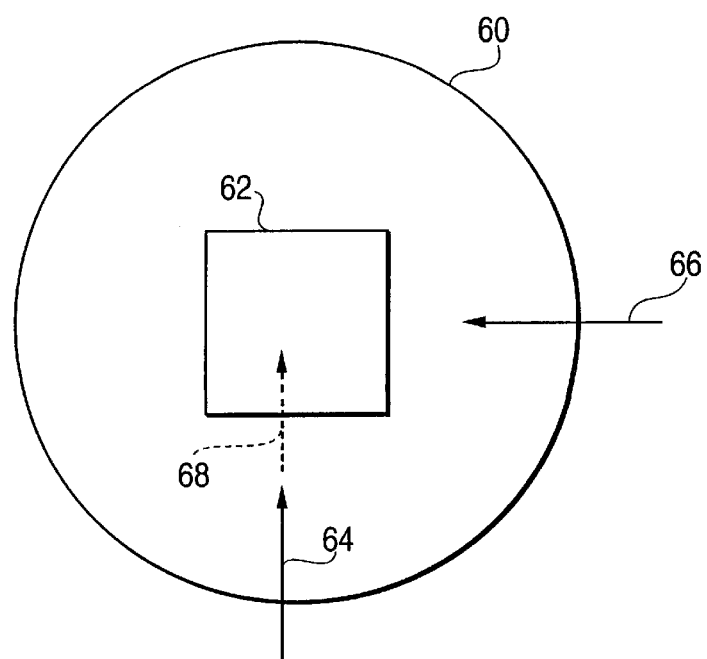
FIG. 5 depicts a system with multiple users.

The present invention is also useful when two or more users are using the same display as depicted in FIG. 5. In the situation depicted in FIG. 5, the two users are positioned at 90 degrees from each other at a table 60 with the flat panel display 62 on a turntable (not shown) of the table 60. Each of the two users has a reference viewing normal 64 and 66 and the display has a current orientation 68 that happens to be aligned with the reference 64 of the first user. In this arrangement, as the display rotates the user interface elements of each user are maintained aligned with the user's reference viewing normal. If the model or art work is made to rotate with the display, as in FIGS. 3a and 3b, the user's reference viewing normal can be used to determine which user is using the display. For example, when the current orientation 68 matches (or is within an angular range of) the user reference (for example near reference 66) the computer can automatically display the user interface elements preferred by that particular user which in this example is for the second user. As an alternative, the users can be identified by a unique input made by the user identifying that user. For example, a first user can be required to hit the "1" key on the keyboard to have his preferred user interface elements displayed. Another alternative for identifying users is to identify them by input device. For example, one person may use a first light pen and a second person may use a second light pen.

Figure 6:
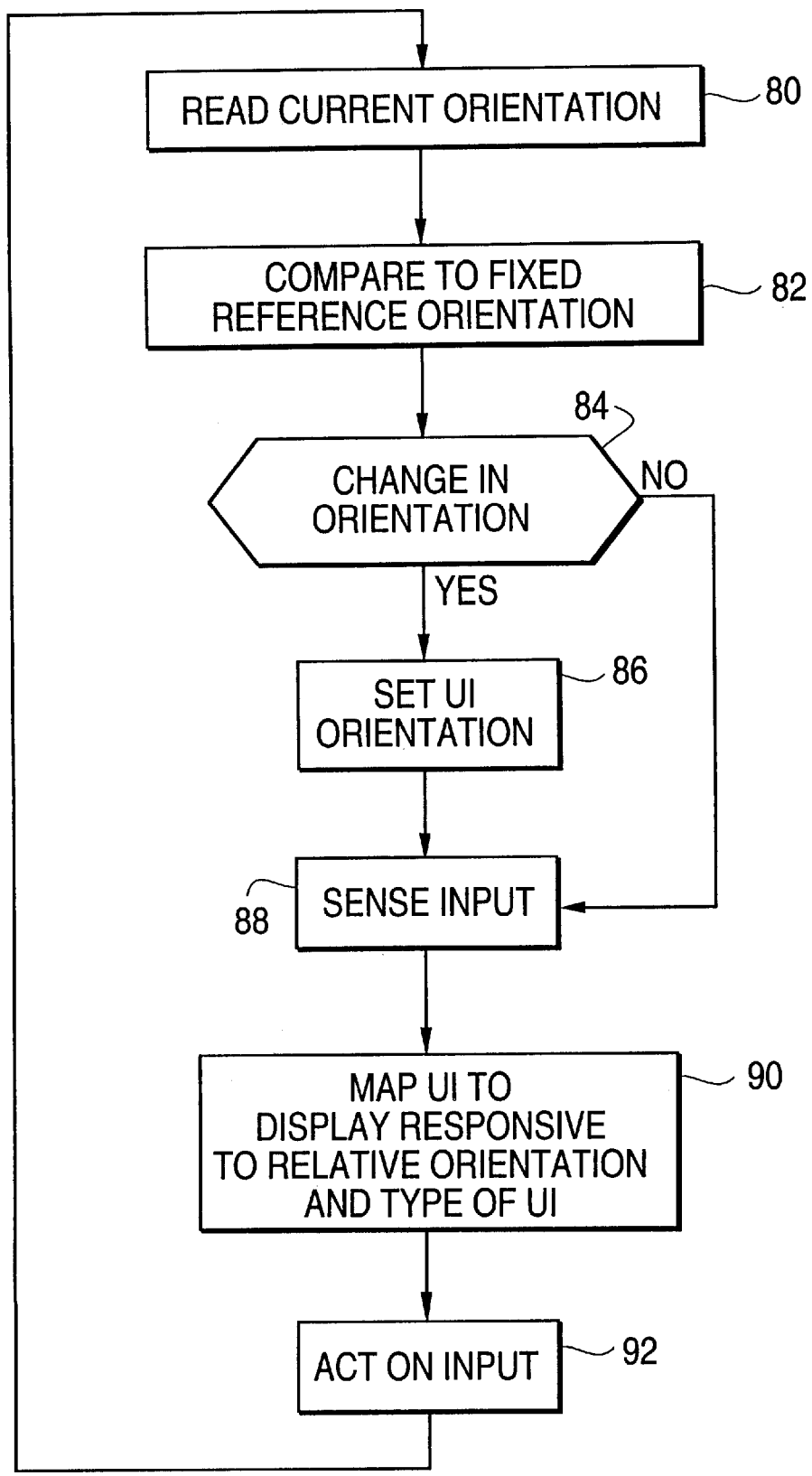
FIG. 6 depicts the actions performed for a single user.

When the system is operating with a single user and the model rotates with the display, actions, such as illustrated in FIG. 6, are performed by computer 10. The current orientation (40) of the display 12 is read 80 by sampling the orientation sensor 14 coupled to the display 12. The current orientation (40) is compared 82 to the fixed reference orientation (36) to determine the relative orientation or difference (38). If there is a change 84 in the relative orientation, the orientation of the user interface (UI) is set 86 responsive to the relative orientation. The system then senses 88 the type of input, such as a marking menu stroke selecting from a radial menu or a right mouse button "click" selecting a pop-up list menu. Based on the type of sensed input and the relative orientation, the particular user interface element is mapped 90 onto the raster display 32 at an orientation aligned with the fixed reference. In this mapping, conventional processes are used to place the user interface element on the display in a way such that it does not block a model or object (or is a translucent overlay of the model), pops-up at or near the pointer, does not run off a side of the display, etc. The action of the input is then interpreted and executed 92. For example, if the type of user interface element being used is a marker menu, the direction of the input stroke relative to the orientation of the user interface element is used to determine the item selected. If the user interface element is a button menu, the button under the pointer is activated upon a mouse left button "click".

Figure 3C:
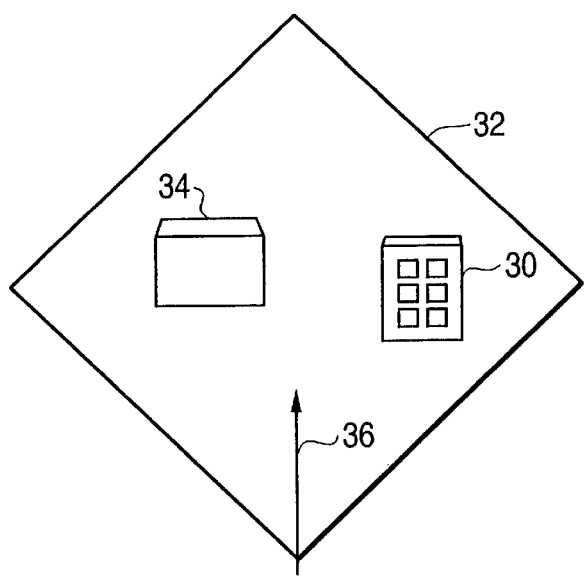

If the model or graphic remains aligned with the fixed reference 36, that is, it does not rotate with the display, as depicted in FIGS. 3a and 3c, the relative position is also used to map the model onto the display.

Figure 7:
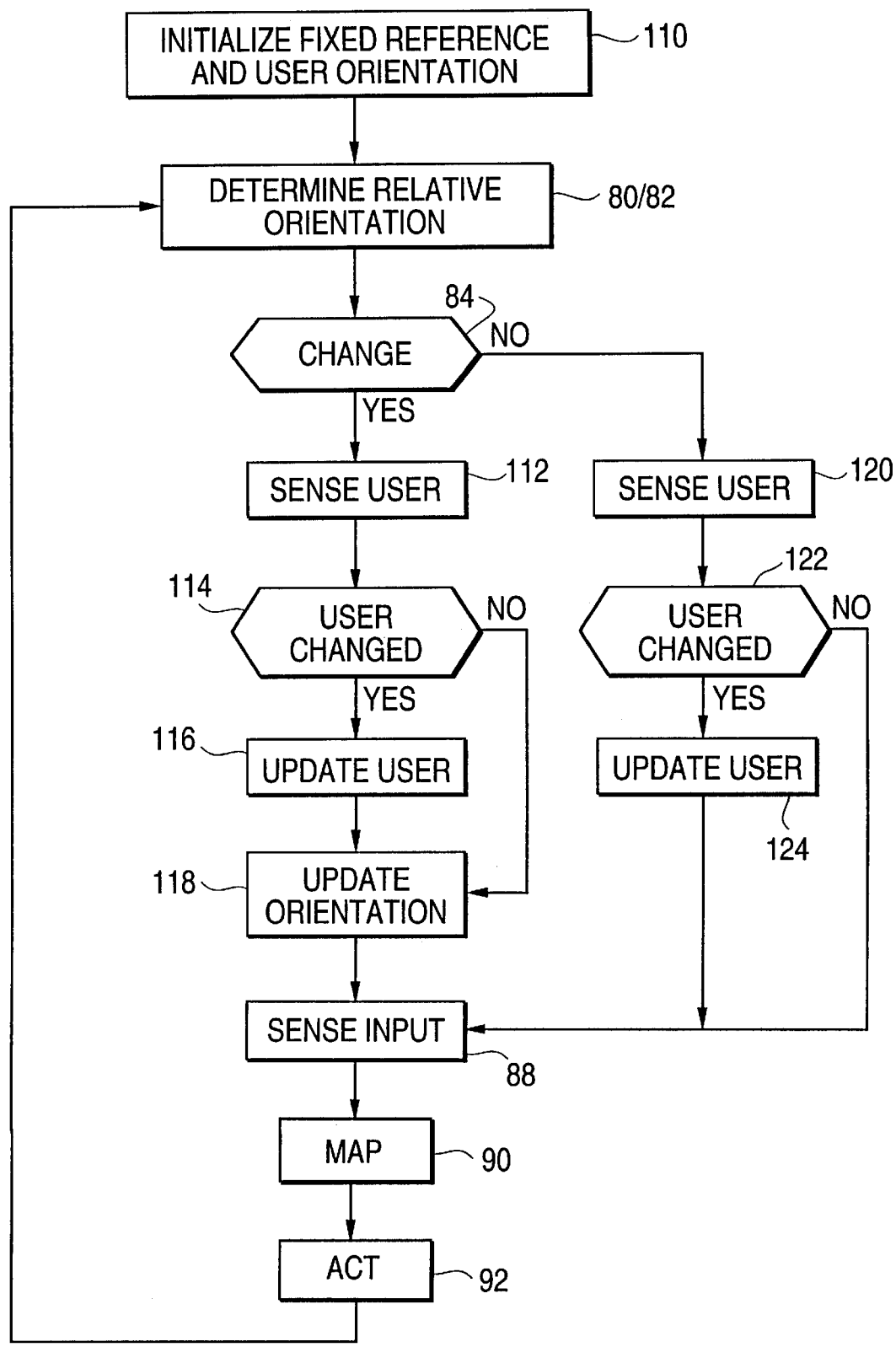
FIG. 7 illustrates the actions performed when multiple users interact with a single display.

When a multiple user system is implemented, a process such as illustrated in FIG. 7 is performed where the first action is to initialize 110 the fixed reference orientation (68) and the orientations (64 and 66) of the various users. This can involve setting the fixed reference orientation as the orientation of the first user, rotating the display to a normal position for a second user and entering a user identifier. The steps 80, 82 and 84 of FIG. 6 are then performed. If the orientation has changed, the system checks 112 to determine who is the user, and if the user has changed 114, the controlling user is updated 116, so that the user's interface elements will be displayed. The relative orientation is then updated 118 and the actions or steps 88, 90 and 92 discussed with respect to FIG. 6 are performed. When the orientation has not changed, similar steps 120, 122 and 124 are performed.

The action being performed in step 92, in addition to being a menu action could also allow another user to be initialized or the entire system to be reinitialized.

The present invention has been described with respect to both simple and complex type orientation changes. A simple orientation change includes simply rotating the display in the plane of the display. A complex orientation change can include rotation in the plane of the display, a change of the angle of the display with respect to horizontal, such as by tilting the display, and revolving the display about an axis. The present invention will adjust the user interface elements of the display as previously discussed with respect to these types of orientation changes. The invention can also be used to sense the movement of a display about in a horizontal plane, like a piece of paper is moved about on a table. Such horizontal movement initiates corresponding changes in the position of a view port onto an object or model.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
   a display displaying a user interface element having a use orientation;
   sensors coupled to said display and sensing a spatial orientation of said display; and
   a display processor adjusting the use orientation of the user interface element relative to the spatial orientation as the spatial orientation changes with the use orientation remaining fixed with respect to a user orientation reference as the spatial orientation changes with respect to the user orientation reference.

2. An apparatus as recited in claim 1, wherein said display comprises:
   a flat panel; and
   a turntable coupled to said panel and allowing said panel to rotate.

3. An apparatus as recited in claim 1, wherein an image on said display is aligned with the spatial orientation.

4. An apparatus as recited in claim 1, wherein an image on said display is aligned relative to the spatial orientation and the use orientation.

5. An apparatus as recited in claim 1, further comprising an input device integrated with said display allowing the user to input by interacting with said display.

6. An apparatus as recited in claim 1, wherein said display can change orientations in three dimensions.

7. An apparatus as recited in claim 1, wherein a view point of an image changes as the display changes orientation.

8. An apparatus, comprising:
   a flat panel display displaying a user interface element having a use orientation;
   a turntable coupled to said display and allowing said display to rotate;

sensors coupled to said display and determining a rotation orientation of said display;

an input device integrated with the display allowing the user to input by interacting with the display; and a display processor coupled to said display, said sensors and said input device, adjusting the use orientation of the user interface element relative to the spatial orientation as the spatial orientation changes with the use orientation remaining fixed with respect to a user orientation reference as the spatial orientation changes with respect to the user orientation reference, aligning a work image on said display to the spatial orientation and executing an interface function responsive to an interface input for the user interface element made relative to the oriented user interface element.

9. An apparatus, comprising:

a display monitor allowing a work image to change orientation corresponding to a change in orientation of said display monitor with respect to a user orientation reference while interface elements remain in a fixed orientation with respect to the user orientation reference.

10. An apparatus, comprising:

a display monitor adapted to allow continuous change in orientation and present a displayed image; and a display control system sensing the continuous orientation change of the display monitor and adapting the displayed image to the continuous orientation change with a use orientation of the display remaining fixed with respect to a user orientation reference as a spatial orientation of the display changes with respect to the user orientation reference.

11. An apparatus, comprising:

a display monitor adapted to allow continuous change in orientation; and a software based system sensing the continuous orientation change of the display monitor and adapting the functions performed to the continuous orientation change with a use orientation remaining fixed with respect to a user orientation reference as a spatial orientation changes with respect to the user orientation reference.

12. A method, comprising:

sensing spatial orientation changes of a display; and changing a visual orientation of user interface element on the display relative to the display as the spatial orientation changes with the user interface element remaining fixed with respect to a user orientation reference as the spatial orientation changes with respect to the user orientation reference.

13. A method of orienting a menu of a display, comprising:

determining a current three-dimensional spatial orientation of the display;

comparing the current orientation of the display to a user determined, fixed orientation reference and determining a difference;

setting a three-dimensional menu orientation of the menu relative to the difference;

mapping the menu onto the display responsive to the menu orientation with the menu orientation remaining fixed with respect to a user orientation reference as the spatial orientation changes with respect to the user orientation; and allowing a user to select from the menu.

14. A method as recited in claim 13, wherein a work image on the display is aligned with the current orientation.

15. A method as recited in claim 13, wherein a work image on the display is oriented relative to the current orientation.

16. A method, comprising:

sensing a spatial orientation of a display; and adapting a function of the display to the orientation with the function of the display being aligned with respect to a user orientation reference while an image of the display is allowed to spatially change with respect to the user orientation reference as the spatial orientation of said display changes.

17. An apparatus, comprising:

an image display movable into different orientations and including a user interface; and an orientation sensor coupled to said display and determining continuous orientations of the display as the display is moved, and said display maintaining orientation of the user interface with respect to a user orientation reference independent of physical position of a displayed image with respect to the user.

18. An apparatus as recited in claim 17, wherein a view point of an image on said display changes as orientation of the display changes.

19. A method, comprising:

allowing a user to continuously change an orientation of a display;

determining the orientation of the display as the display continuously changes orientations; and maintaining an orientation of a user interface with respect to a user orientation reference independent of physical position of the display with respect to the user orientation reference.

20. A computer readable media including a process sensing spatial orientation of a display and changing a visual orientation of a user interface element on the display relative to the display as the spatial orientation changes maintaining an orientation of the element with respect to a user orientation reference as the spatial orientation of the display changes with respect to the user orientation reference.

21. An apparatus, comprising:

a display displaying a display image, having a spatial orientation and a user interface element having a use orientation; and means for decoupling the spatial orientation and the use orientation with the user interface element maintaining a fixed orientation as the spatial orientation changes.

\* \* \* \* \*